Jan. 13, 1931. J. GRANT 1,788,630
BEARING FOR DRILL STEMS
Filed Aug. 15, 1927 4 Sheets-Sheet 1
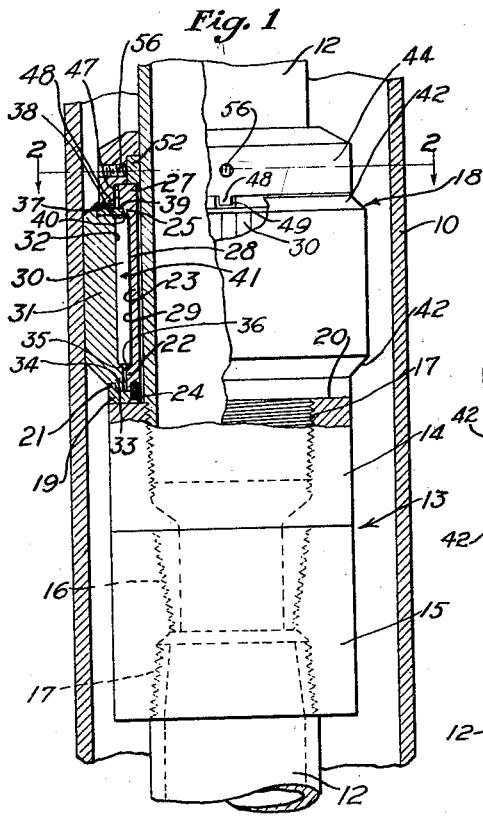
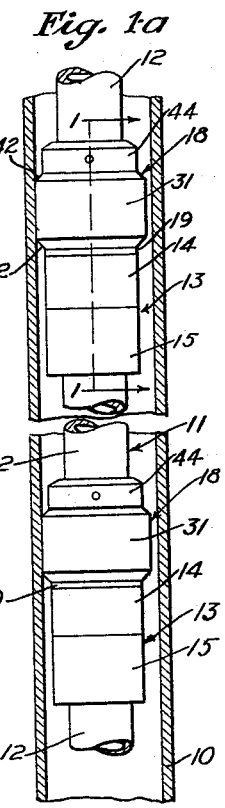
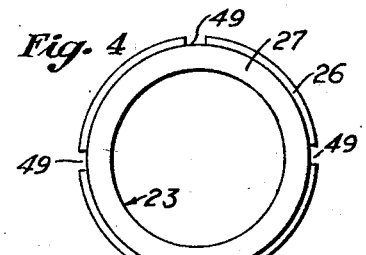
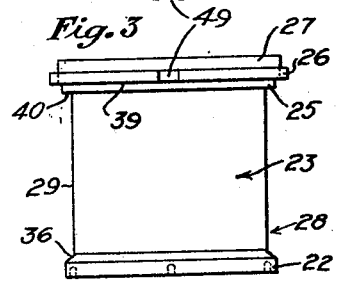
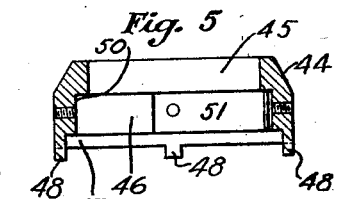
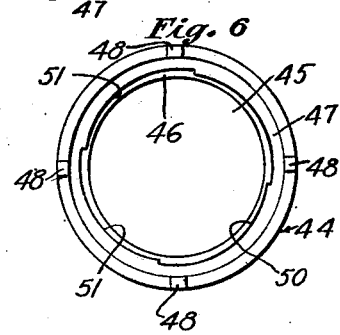
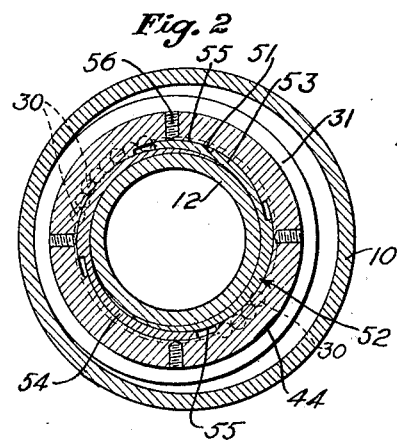
Inventor
JOHN GRANT
Attorney

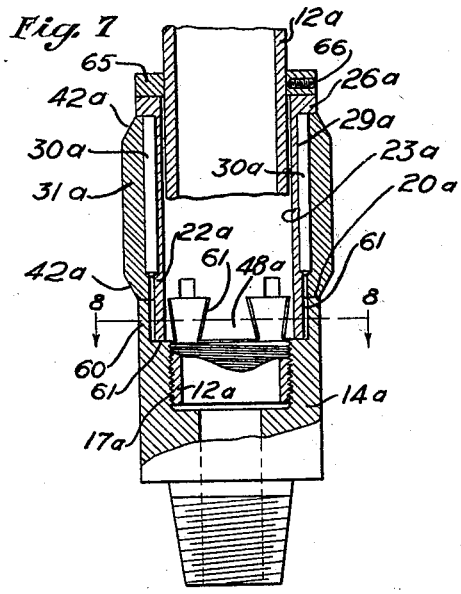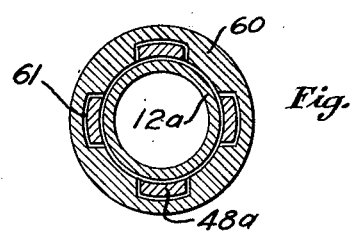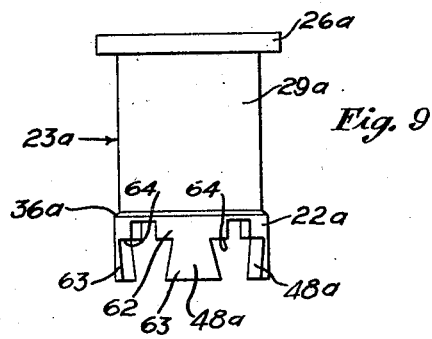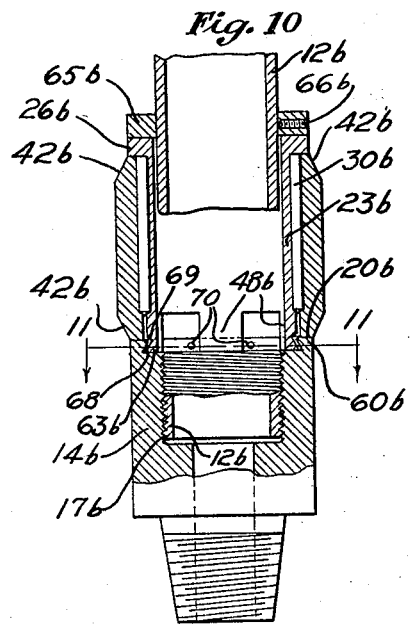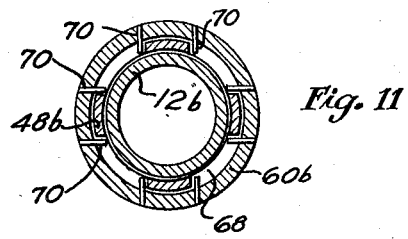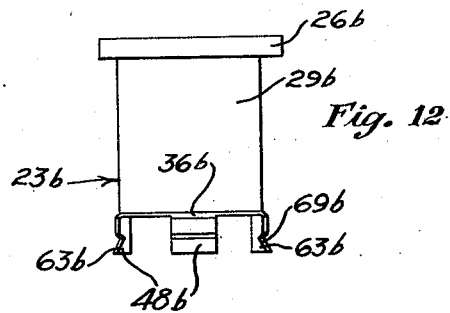

Jan. 13, 1931.  J. GRANT  1,788,630
BEARING FOR DRILL STEMS
Filed Aug. 15, 1927    4 Sheets-Sheet 3
Fig. 13
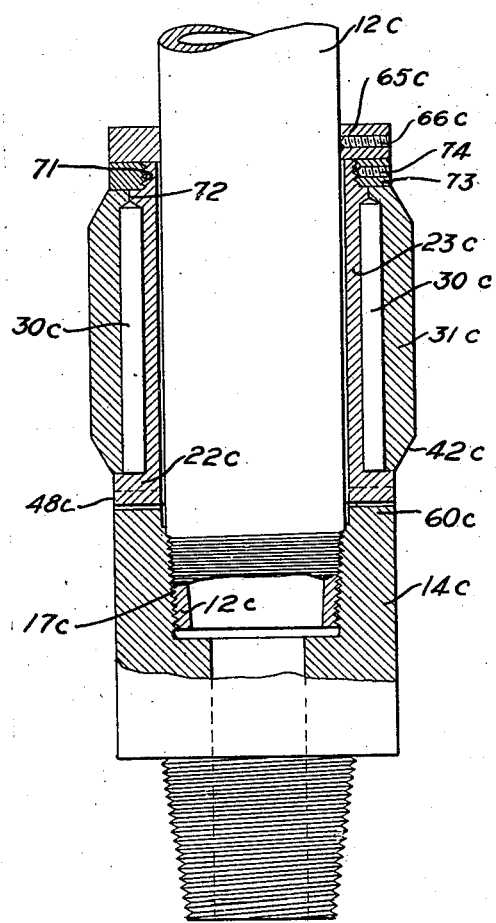
Fig. 14
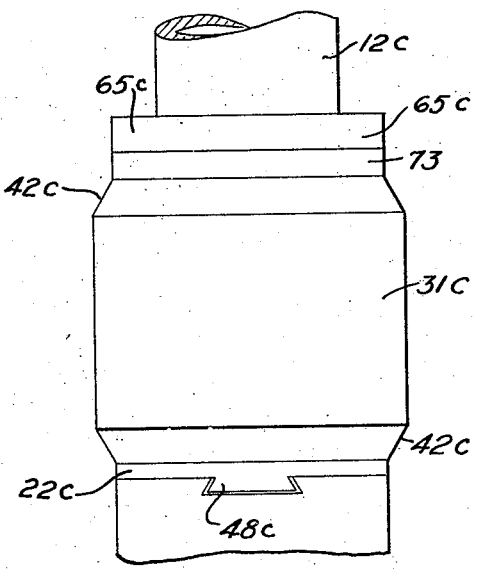
Fig. 15
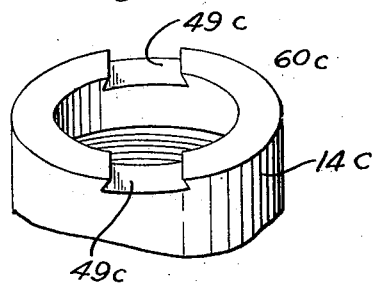
Inventor
JOHN GRANT
Attorney Jan. 13, 1931.　　　J. GRANT　　　1,788,630
BEARING FOR DRILL STEMS
Filed Aug. 15, 1927　　4 Sheets-Sheet 4
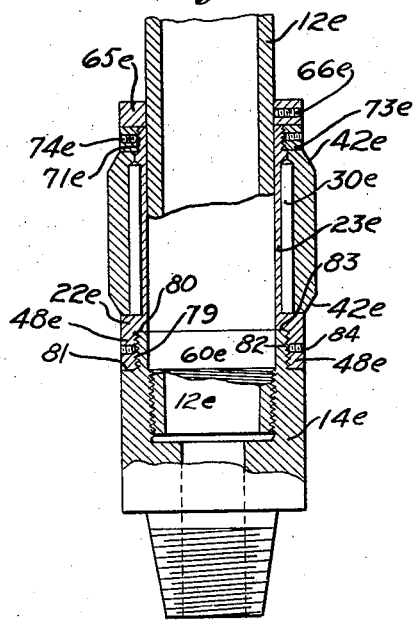
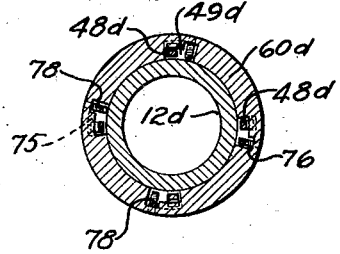
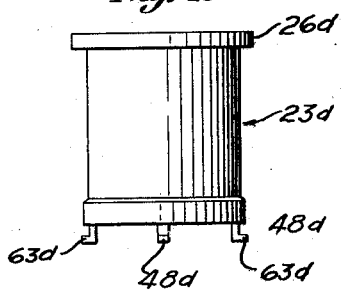
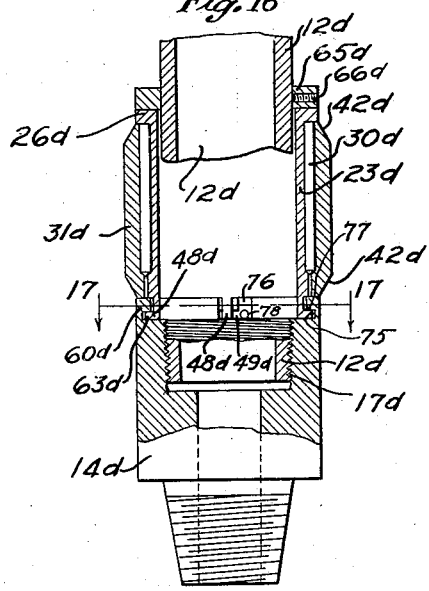
Inventor
JOHN GRANT
Attorney Patented Jan. 13, 1931

1,788,630

UNITED STATES PATENT OFFICE

JOHN GRANT, OF LOS ANGELES, CALIFORNIA

BEARING FOR DRILL STEMS

Application filed August 15, 1927. Serial No. 212,907.

This invention has to do generally with the deep well drilling art, and is more particularly concerned with devices for protecting well casings from the abrasive effects, etc., of drill stems rotating therein.

It has been proposed and attempted to reduce to a minimum or eliminate these most undesirable effects on casings by the provision of antifriction bearings at intervals along the stem, the stem thus being kept out of direct contact with the casing. A typical bearing includes relatively rotatable inner and outer sleeves, the inner sleeve being connected to the drill stem for rotation therewith and the outer sleeve being of greater diameter than the tool joints and being adapted to engage the casing peripherally when the stem swings off center, the outer sleeve being held from appreciable rotation with respect to the casing by virtue of such frictional engagement therewith.

However, it has been found difficult to provide bearings having all the characteristics necessary to render them fully efficient. The bearings must not only be inherently sturdy to resist effectively the tremendous strains to which they are exposed, but the type of connection between them and the drill stem must be such as will permit of their easy mounting and dis-mounting, it being understood that on a drill stem several thousand feet in length there will be a great number of anti-friction bearings, and that the time element of mounting or dis-mounting the bearings is therefore an important factor in the ultimate cost of equipping a stem.

Furthermore, the connection must be such as will assure that the bearings remain in adjusted position on the stem in spite of the great displacement strains to which they are exposed. It is also essential that the bearings be comparatively simple in construction, having a minimum number of parts so the danger of disorder is reduced to a minimum.

Therefore, it may be considered as the general object of the present invention to provide an efficient drill stem bearing which is relatively simple and sturdy of construction, relatively cheap and easy to manufacture, assemble and install, and which has such characteristics that it effectively resists the tremendous strains to which it is exposed. While my invention has other objects and presents other novel features, these may be discussed to better advantage as the following detailed description progresses. Reference will be had to the accompanying drawings, in which:

Figure 1a is a fragmentary sectional view through a deep well casing showing in elevation therein an embodiment of my invention applied to the drill stem.

Figure 1 is an enlarged fragmentary section on line 1—1 of Fig. 1a, parts of the bearing and tool joint being shown in elevation.

Figure 2 is a section on line 2—2 of Fig. 1.

Figure 3 is a detached elevation of the inner sleeve of the bearing.

Figure 4 is a top plan view of Fig. 3.

Figure 5 is a medial sectional view through one element of a positioning member.

Figure 6 is a bottom plan view of Fig. 5.

Figure 7 is a medial sectional view showing a variational type of connection between the bearing and drill stem.

Figure 8 is a section on line 8—8 of Fig. 7.

Figure 9 is an elevation of the inner bearing sleeve shown in Fig. 7.

Figure 10 is a medial sectional view of a bearing having another variational type of connection between it and the drill stem.

Figure 11 is a section on line 11—11 of Fig. 10.

Figure 12 is an elevation of the inner bearing sleeve shown in Fig. 10.

Figure 13 is a medial sectional view of a bearing having another variational type of connection between it and the drill stem.

Figure 14 is a fragmentary elevation of Fig. 13 as viewed from the right thereof.

Figure 15 is a fragmentary perspective of the end of the tool joint adapted to take the bearing sleeve shown in Fig. 13.

Figure 16 is a medial section of a bearing having another variational type of connection between it and the drill stem.

Figure 17 is a section on line 17—17 of Fig. 16.

Figure 18 is an elevation of the inner bearing sleeve shown in Fig. 17; and

Figure 19 is a medial section of a bearing having another variational type of connection between it and the drill stem.

At 10 is indicated the casing of a deep well, there being within this casing a usual rotary drill stem 11 made up of pipe sections or portions 12 coupled by tool joints 13. As is usual, each tool joint is made up of a "pin end" or element 14 and a "box end" or element 15, these elements being adapted to be threadably connected in axial alinement at 16 and each having internal threads 17 to take the associated pipe sections 12.

My improved bearings, generally indicated at 18, are provided along the drill stem at points intermediate the tool joints, or, expressed otherwise and in contradistinction to the type of bearing provided on the peripheral faces of the tool joints themselves, my bearings encircle the pipe where it is exposed between tool joints. The bearings are positioned on the stem by association with a member rigidly connected to the pipe sections, that part of the bearing which is to rotate with the pipe preferably being drivingly connected to the pipe through said member.

While I have shown several variational forms of bearings and connective elements, said forms have a common feature in that they include a pair of relatively rotatable inner and outer sleeves, the inner sleeves being drivingly connected to the aforementioned rigidly mounted member. The outer sleeve, which is of greater diameter than the tool joint, is adapted to engage the casing peripherally so when it is pressed thereagainst it will be frictionally held against rotation, it following that drill stem rotation rotates the inner sleeve within the outer so the wear comes on the sleeves rather than on the casing and tool joints, to obvious advantage. The bearings may thus be considered as means for keeping the rotating drill stem out of direct contact with the well casing.

Broadly, the bearing between sleeves may be of any suitable character, such as direct peripheral contact, but I prefer to provide anti-friction members such as rollers or balls between the sleeves, though the showing and description of this provision are not to be considered as limitative on the invention, considered in its broader aspects.

As a feature of certain variational forms of the bearing, the inner sleeve is not only drivingly connected to the rigidly mounted member on the stem, but it is also held by direct connection to said member against movement longitudally along the pipe in either direction. In other variations, however, dependence is had upon the rigidly connected member only to connect the sleeve drivingly to the drill stem and to hold the sleeve from movement longitudinally along the pipe in one direction, there then being provided another member on the pipe for limiting movement of the sleeve longitudinally in the opposite direction. The bearing assembly is preferably such that the positioning of one sleeve on the pipe serves to position the other sleeve thereon, it following that when dependence is had upon the rigidly connected member to position the inner sleeve longitudinally on the stem, said member also serves to position the entire bearing longitudinally on the stem.

While the exact location of the bearing on the stem is not controlling on the present invention, its most logical position is one closely adjacent the tool joint, for it is the joint which is naturally most prone to engage the casing. Accordingly, the tool joint may be utilized as the aforementioned rigidly connected member through which driving connection is made between the stem and inner sleeve, and through which the inner sleeve and bearing may be longitudinally positioned on the stem. Or, in the event another rigidly connected member is utilized to provide the driving connection between the stem and sleeve, the tool joint may be utilized to position or aid in positioning the inner sleeve or bearing longitudinally on the stem. Naturally, the utilization of the tool joint for any of these purposes dispenses with the necessity of adding an equivalent member to the stem and therefore is of advantage.

In most well drilling operations, the stem is elevated and lowered through the medium of elevators which engage the downwardly facing annular shoulder defined about the stem by the lower end of the tool joint. Accordingly, it is desirable that this shoulder be left fully exposed for such elevator application, and it follows that ordinarily the bearing assembly preferably is on top a given tool joint. However, there are now coming into use elevators which include wedge slips adapted to grip the stem at points intermediate the tool joints. In such situations, my bearings may be applied to the stem immediately below the tool joint, and it will be made apparent that certain variational forms illustrated show a type of connection between the tool joint of other rigidly connected members and the inner sleeve and bearing which will allow the actual suspension of said sleeve and bearing from the tool joint or equivalent member. However, I have illustrated all the variations as being applied to the stem above the tool joint, but this is done merely as convenience and my claims are not to be construed as being limited to the illustrated arrangement and location of the bearings.

In Figs. 1 to 6, inclusive, I have shown an embodiment of the invention wherein a member other than the tool joint is rigidly connected to the drill stem and provides the driving connection between said stem and the inner sleeve of the bearing. In this case, the tool joint is utilized to limit the movement of the bearing longitudinally in one direction along the stem, the rigidly connected member limiting such longitudinal movement in the other direction. Of course, the tool joint is also rigidly connected to the stem, but here it is not employed as a driving connection between stem and inner sleeve.

Bearing assembly 18 includes an end-thrust washer 19 whose under-face is adapted to engage the upwardly facing, annular shoulder 20 presented about the upper pipe section 12 by the pin end 14 of joint 13, said shoulder 20 thus being adapted to limit movement of the bearing downwardly along the stem, as will hereinafter be apparent. Washer 19 has an upwardly extending annular flange 21 which is annularly spaced from the lower, external flange 22 on inner, cylindric sleeve 23, and preferably, though not necessarily, connection is made between the sleeve and washer as by pins or screws 24 to hold them against relative rotation.

Sleeve 23 has at its upper end the three external annular flanges 25, 26 and 27, flange 26 being intermediate the other two flanges and being of greatest diameter. Flanges 22 and 25 may be considered as vertically defining an annular recess 28 about the sleeve, the cylindric defining face 29 of this recess presenting the bearing surface of the sleeve, though there are preferably provided rollers 30, or other suitable anti-friction members, between this sleeve and the outer coaxial and encircling sleeve 31, the bore defining wall 32 of the outer sleeve being the inner bearing face thereof. Sleeves 23 and 31 are thus mounted for relative rotation and it will be seen that they may be considered as inner and outer roller races, though it is to be understood that the provision of anti-friction members between the sleeves is not controlling on the invention, for the bearing surfaces of the sleeves may be of a nature to allow direct contact therebetween, as is readily understandable.

The lower end of sleeve 31 is provided with an annular flange 33 which is taken in the annular space 34 defined by flanges 21 and 22. This flange coaction holds the outer sleeve from shifting laterally. Flange 33 may extend inwardly somewhat beyond bearing face 32, the shoulder 35 thus provided acting with the upper shoulder 36 of flange 22 to hold rollers 30 against displacement downwardly. The upper end of sleeve 31 has a counterbore 37 within which is set a washer 38, the upper face of this washer shouldering against the downwardly facing shoulder 39 of flange 26, the washer overhanging bearing face 32 and, with downwardly facing shoulder 40 of flange 25, serving to define the upper end of the annular space 41 annularly defined by the two sleeves, it being within this recess that the rollers are mounted.

In assembling the bearing, washer 38 is first slipped over the sleeve and into contact with flange 26, the rollers and outer sleeve then being slipped endwise into position, the upward movement of the outer sleeve being limited by its contact with said washer. Lower washer 19 is then moved into and secured in the position illustrated, the assembly being such that thereafter the bearing may be handled as a unit without danger of falling apart during handling. The assembly is slipped over upper pipe section 12 either from beneath prior to connection of said section and tool joint, or from above if connection between the pipe section and joint element has already been made, assuming that the tool joint element at the other end of said pipe section has not as yet been connected.

The diameter of the outer sleeve 31 is appreciably greater than that of tool joint 13, and somewhat less than the bore of casing 10, as is apparent in Fig. 2. Preferably, the upper and lower ends of the outer sleeve are beveled or inclined inwardly as at 42, the lower end preferably meeting flange 21 and the upper end preferably meeting flange 26 so there may be no square-cut shoulders to engage the ends of the casing sections as the bearing is passed through the coupling collars (not shown) of said casing. The beveled or conical ends 42 of the collars may thus be considered as means for guiding the bearings and joints as they pass through these casing couplings.

At 44 is indicated a connector member adapted to be rigidly connected to the drill stem and through which the inner sleeve 23 is drivingly connected for rotation with said stem. Member 44 is also adapted to limit movement of the inner sleeve and bearing upwardly along the pipe, it forming with joint element 14 a pair of opposed shoulders spaced longitudinally along the drill stem and between which the bearing is confined to limit its longitudinal movement. As will be apparent, member 44 is adapted to be adjusted longitudinally along the pipe, means being provided to hold it rigidly to said pipe in any desired position of adjustment. While I have shown a preferred method of thus fixing it to the pipe, this means being generally described as radially expansible and contractible pressural means, it will be understood that any suitable type of connection may be substituted without departing from the spirit and scope of the invention.

Member 44 is in the form of a collar having a bore 45 adapted to take pipe section 12, and counterbores 46 and 47. Counterbore 47 is adapted to take flange 27 of sleeve 23, and the lower edge of collar 44 is provided with a plurality of angularly spaced, depending or longitudinally projecting locking lugs or fingers 48 which enter complementary notches 49 provided in sleeve flange 26. These projections may also be considered as extending longitudinally into telescopic relation with the inner sleeve.

Defining wall 50 of counterbore 46 has eccentric cam faces 51, and the counterbore is adapted to receive radially expansible and contractible ring 52 between said faces and pipe section 12. In the illustrated embodiment this expansible or split ring is made up of two sections 53 and 54, but it will be understood any suitable type of expansible and contractible ring may be substituted without departing from the spirit and scope of the invention. Ring sections 53 and 54 have external cam faces 55 complementary to faces 51, it following that rotation of collar 44 in one direction with respect to the pipe section acts to constrict the ring sections tightly about the pipe section, while rotation of the collar in the opposite direction allows said ring sections to loosen.

The cam faces are preferably so fashioned that the tendency of the drill pipe during rotation thereof is to tighten or radially contract the ring about the pipe. Thus, assuming that the drill stem be rotated normally right-handedly, as viewed from above, any tendency to hold collar 44 from movement, which would be the equivalent of rotating said collar left-handedly as viewed from above, tends to constrict the ring about the pipe and thus more rigidly hold the collar to the pipe.

After collar 44 has been actuated to constrict the split ring and thus rigidly position said collar on the pipe set screw 56 may be threaded through the collar and into contact with the ring section to hold the collar against undesired loosening movement.

Since projections or lugs 48 enter notches 49, it will be evident that the sleeve is drivingly connected through said lugs and collar to the pipe section so as to rotate therewith, it following that when the outer sleeve peripherally engages the casing, the drill stem and sleeve rotate within it, the rotational wear and abrasive action thus being taken by sleeve elements rather than by the casing or tool joint.

Now, the inner sleeve, throughout its length, may be in peripheral contact with the pipe section, it following that there is no lost motion between the sleeve and pipe which would tend to develop excessive wear and consequent intermittent engagement between the sleeve and stem tending to damage either or both. This situation may be brought about by accurate machining of the sleeve to fit pipe of given outside diameter. However, in actual practice standard pipe so varies in outside diameter that it is practically impossible to provide sleeves of uniform inside diameter which will fit properly any two lengths or sections of pipe. Accordingly, to render manufacture feasible, the inner sleeves are preferably, though not necessarily, fashioned with their inside diameter sufficiently large to take the largest diameter pipe which is to be expected under a given standard dimension. It then follows that the inside diameter of these standard sleeves will be somewhat greater than the outside diameter of pipe sections which are nearer the lower end of the variational range of this standard. With a consequent annular clearance existing between the standard collar and these smaller pipe sections, it is necessary to prevent such movement of the inner sleeve as will tend to have undesirable effects. This may either be done by so rigidly securing the connected end of the sleeve to the drill stem as to prevent the free end of the sleeve from being pressed or rocked into contact with the pipe section (such a provision may be true of the variation shown in Fig. 19 of the drawings) or, such movement must be allowed the sleeve at its connected end as will permit said connected end to move coincidentally with the free end and thus allow the sleeve to move so, throughout its length, it is in peripheral engagement with the pipe section at some one time extending lengthwise of the pipe section. In other words, the rotational driving connection between the rigidly connected member and one end of the sleeve must be such as will allow limited and substantially uniform transverse movement of the sleeve, and therefore of the bearing, throughout its length and with respect to the pipe, that is, so the sleeve is movable about the pipe with its axis remaining substantially parallel with that of the pipe. It follows that the connection between sleeve and rigidly connected member is such that said sleeve has no inherent tendency to be canted or pressed angularly in a manner to carry its free end only, into contact with the pipe section. This result may be accomplished through the medium of a loose rotational connection and the allowance of transverse play between the member rigidly connected to the stem and the inner sleeve. Such is the medium employed here.

In the embodiment illustrated in Fig. 1, this rotational looseness of the sleeve and member connection and the allowance for transverse play is provided by making the lugs 48 sufficiently narrower than notches 49, and by allowing ample annular clearance between exterior peripheral faces of the sleeve and the opposing inner peripheral faces of the connecting elements. For instance, there is annular clearance between flange 27 and the defining wall of collar flange 47. There is also transverse clearance between lug 48 and the overhanging end of sleeve 31. The upper ends of the inner sleeve and bearing are thus allowed limited movement transversely with respect to the pipe coincidentally with such movement of the lower end, it following that the sleeve and bearing may move transversely and bodily to and fro with their coincident axes remaining substantially parallel to that of the pipe, and pressures exerted inwardly against the free end of the sleeve or bearing by virtue of pressural contact between the casing and outer sleeve will then not incline the sleeve with respect to the pipe axis.

In the drawings, while I have shown one side of the outer sleeve in contact with the casing, for the sake of clearness I have not shown the bearing and inner sleeve shifted transversely to move said sleeve into contact with the pipe section, as would normally occur when the outer sleeve is in pressural contact with the casing.

I will now proceed to a description of the variational types of bearings and connective elements between them and the drill stem, it being characteristic of all these variations that the inner sleeve of the bearing is drivingly connected to the tool joint itself for rotation with the stem. However, it will be distinctly understood that this illustration of the utilization of the tool joint as the drive connective member is not to be construed as indicating that these variational devices are limited to such utilization of the joint, for the connection may as well be made to a member other than the tool joint, just as in the embodiment just described. It will also be remembered that while the bearings are shown above the tool joint they may as well be provided below the joint, and, in certain of the variations, actually suspended from the tool joint or an equivalent rigidly connected member.

Such of the elements or formations of the variational types of bearings as are similar to those disclosed in the first described form will be given the same reference numerals with letter exponents, and it will be understood that their features and functions are generally those described in connection with said first form and therefore need not be discussed individually. So, also, it will be understood that in all the variations, except that shown in Fig. 19, clearances are provided between the elements of the driving connection whereby there is rotational looseness allowing the heretofore described transverse, uniform movement of the sleeve throughout its length so its axis may remain substantially parallel with that of the stem, the purpose being identical with that set up in connection with the previously described embodiment.

In Fig. 7 tool joint element 14a is internally threaded at 17a to take pipe section 12a and preferably, though not necessarily, an annular flange 60 extends upwardly from the end of the element. At angularly spaced points about this flange are provided the under-cut or dove-tail recesses 61, these recesses opening to the upper end and to bore of the joint element. An inner sleeve 23a, generally similar to sleeve 23, is adapted to encircle pipe section 12a and to be put into driving connection with the tool joint element, the connection also being such that the tool joint positions the inner sleeve longitudinally on the stem.

Sleeve 23a has a lower flange 22a and an upper annular flange 26a, these flanges defining the longitudinal extent of the cylindric bearing face 29a. Depending from flange 22a are the spring fingers or longitudinally extending lugs 48a, said lugs each having an upper portion 62 and a lower dove-tailed portion 63, said dove-tail portions being substantially complementary to recesses 61. At each side of a given dovetail portion and at its upper end, there is provided a square-cut shoulder 64.

Before pipe section 12a has been threadably connected to element 14a, spring fingers or projections 48a are pressed radially inwardly and introduced telescopically to the bore of flange 60. When the projections are in register with recesses 49a they spring thereinto, and pipe section 12a may thereafter be passed through the sleeve bore and into threaded connection with the joint element. Fingers 48a thus engage the tool joint element in a manner to connect sleeve 23a and element 14a drivingly so the sleeve will rotate with the stem, and the dove-tail formation of the fingers and recesses serves to hold the joint element and sleeve against relative longitudinal movement.

It will be understood that recesses 61 may be cut directly in the upper ends of standard tool joints, though it is preferred to provide the extension flange or annular apron 60 in order that the provision of the recesses may not lessen the extent of threaded engagement between tool joint and pipe section below standard, a lessening which would result, of course, were the recess to be cut in the upper extent of the threaded portion of standard tool joints. It will, therefore, be understood that wherever I refer to a flange on the end of a tool joint element for taking the interlocking recesses, this is not to be construed as limiting the invention to a tool joint having such a flange.

Outer sleeve 31a is generally similar to sleeve 31, being longitudinally positioned on the drill stem by inner sleeve flange 26a at one end, and at the other end by the upwardly facing annular shoulder 20a presented by flange 60 where it extends radially outwardly beyond inner sleeve flange 22a. It may be noted that preferably the square cut shoulder 64 of fingers 48a also engage the end face of flange 60.

Sleeve 31a is rotatably mounted on the inner sleeve, and is preferably, though not necessarily, annularly spaced therefrom by anti-friction means such as hardened rollers 30a.

Though this is not essential to the invention, since the dove-tail connection between the tool joint element and inner sleeve prevents longitudinal separative movement thereof, I may provide a collar 65 above the flange 26a of the inner sleeve and releasably fixed to pipe section 12a by set screw 66. In the event of undue wear in the dove-tail connection or if the connection be designed to provide only for a rotational driving connection between the inner sleeve and the tool joint element, collar 65 is adapted to hold the inner sleeve and hence the bearing assembly from movement longitudinally along the stem in a given direction. It also serves the purpose of taking from the bearing assembly such strains as might otherwise be imposed thereon by the tendency of the pipe section to bend.

In Figs. 10, 11 and 12 I have shown a variation generally similar to Fig. 7, but differing in the type of dove-tail connection between the inner sleeve of the bearing and the tool joint element. In this case the flange 60b at the upper end of joint element 14b is provided with an annular under-cut groove 68, the entrance mouth to this groove preferably being given flaring characteristics by reason of the upwardly and outwardly inclining or conical shoulder 69.

Inner sleeve 23b has downwardly extending projections 48b, capable of being sprung radially inwardly, and having at their ends radial extensions or heads 63b which present upwardly and inwardly inclining faces 69b which are substantially complementary to the angular walls of the under-cut groove 68. Before pipe section 12b has been threadably connected to joint element 14b fingers 48b are sprung inwardly, the chamfer 69 aiding in springing the fingers inwardly as the sleeve is pressed downwardly, and as soon as heads 63b register with the under-cut recess in flange 60b, they spring thereinto. Thereafter pipe section 12b may be threaded into connection with joint element 14b. The over-hanging wall of the under-cut recess coacts with head faces 69b to position the inner sleeve longitudinally on the drill stem, and in order to connect the joint element and inner sleeve drivingly so said sleeve rotates with the drill stem, pins 70 are extended from flange 60b radially into recess 68 at opposite sides of projections 48b.

The remaining elements of the bearing are substantially the same and have the same functions as those described in connection with Fig. 7. They are indicated by similar reference numerals with the exponent b.

It may be stated that in the forms shown in Figs. 7 and 10 such clearances exist in the driving connections between the sleeves and tool joint elements as to provide rotational looseness and allowance of transverse play therebetween, and this looseness may be considered as allowing relative gyratory movement between the bearing and tool joint or equivalent rigidly fixed member on the drill stem, such gyratory movement being capable of occurring with the axis of the inner sleeve remaining substantially parallel with the axis of the drill stem. It will be understood that this description of allowable movement of the inner sleeve applies to all variations illustrated except that shown in Fig. 19.

In the variations illustrated in Figs. 13 to 15, inclusive, inner sleeve 23c is provided with a lower external flange 22c from which depend a pair of diametrically opposite dove-tail lugs 48c. Sleeve 23c is threaded at its upper end 71, and below the threaded portion is provided an external annular flange 72. About the sleeve and longitudinally positioned by flanges 22c and 72 may be the hardened rollers 30c. An outer sleeve 31c is rotatably mounted on the inner sleeve through the medium of rollers 30c, and is held against longitudinal movement over the inner sleeve at one end by its engagement with flange 22c and at its other end by retention collar 73 which is threaded on the inner sleeve at 71 and preferably into engagement with flange 72. A set screw 74 may be utilized to hold the retention collar releasably in adjusted position.

The flange 60c on the upper end of joint element 14c is provided with a pair of diametrically opposite under-cut or dove-tail ways or recesses 49c, said ways being substantially complementary to lugs 48c. Before pipe section 12c has been threaded into joint element 14c, the fully assembled bearing may be passed transversely across the end of the tool joint element, lugs 48c being held in alinement with recesses 49c so they enter such recesses during such transverse movement of the bearing. After the sleeve and tool joint element are substantially in axial alinement, at which time lugs 48c are fully entered in recesses 49c, pipe section 12c is lowered down through the sleeve bore and into threaded connection with the tool joint element. It will be seen that the pipe section thereafter holds the bearing assembly from moving transversely out of connection with the tool joint element. Should bearing replacement or repair be desirable, it is only necessary to unscrew the pipe section from the tool joint and then merely slide the bearing assembly across the end of the joint element to carry lugs 48c out of recesses 49c, whereupon the assembly may be lifted clear of the element.

It will be seen lugs 48c provide both a driving connection between the joint element and sleeve 23c, so it will rotate with the stem, and means for positioning the inner sleeve and entire bearing assembly longitudinally along the stem. There is such clearance between the sleeve and tool joint element at points of driving connection as will allow the hereinbefore described transverse movement of the sleeve throughout its length.

If desired, a collar 65c, releasably locked in adjusted position on pipe section 12c by set screws 66c, may be provided to have the same function as that described in connection with collar 65.

In the variation shown in Figs. 16 to 18, inclusive, I have shown a bayonet slot and pin type of connection between the tool joint or equivalent member and the inner sleeve of the bearing. In this embodiment, inner sleeve 23d has a plurality of angularly spaced lugs or projections 48d which extend longitudinally from the lower end thereof and carry outwardly and angularly extending heads 63d.

Flange 60d, of joint element 14d is provided with recesses 49d, each of which extends arcuately about the joint element and opens inwardly to the flange bore at a point below the upper end of the flange. Recesses 49d open into under-cuts 75, while longitudinally extending ways 76 open at one end to the end of the flange and at the other end to recesses 49d and under-cut 75. The recesses and ways are so fashioned that when heads 63d are in vertical alinement with ways 76, the inner sleeve may be dropped until said heads are in horizontal alinement with under-cuts 75. Thereafter, proper rotation of the sleeve with respect to the joint element rotates heads 63d beneath the downwardly facing shoulders 77 which define the top of under-cuts 75.

To insure that the sleeve may not be rotated back in a manner to disengage the lugs from flange 60d, stop bolts 78 may be threaded through the flange so they project into longitudinal ways 76 where the latter meet recesses 49d and under-cuts 75. The bolts thus form removable barriers for preventing back rotation of lugs 48d.

It will be seen that with heads 63d thus confined within the under-cuts, lugs or projections 48b serve to connect the joint element and sleeve drivingly so the sleeve rotates with the drill stem, and also position the inner sleeve and bearing longitudinally on the stem.

The remaining portions of the bearing and associated elements may be similar to those described in connection with the other figures and therefore will not be described in detail here. They are given similar reference numerals with the letter exponent d.

In the variation shown in Fig. 19, tool joint element 14e is provided with a flange 60e which is of lesser diameter than the body portion of the joint element. Of course, it lies within the scope of my invention to provide flange 60e by merely turning down the end of a standard tool joint element, but since such an operation would tend somewhat to weaken the element, it is preferred, though not necessary, to provide this flange by extending a standard tool joint.

Flange 60e is externally threaded at 79, and presents an upwardly facing shoulder 80. About the lower end of the flange, the body of the tool joint presents an upwardly annular shoulder 81. Inner sleeve 23e has at its lower end an annular flange 22e from which extends a downward projection 48e, this projection being in the form of an internally threaded annular flange adapted to be threaded onto flange 60e. In effect, flange 22e provides a counterbore 82 adapted to take flange 60e, the end-defining wall 83 of this counterbore preferably, though not necessarily, shouldering against the end of flange 60e, and the end of flange 48e engaging shoulder 81. Set screws 84 may be threaded through flange 22e and into engagement with flange 60e to hold the inner sleeve releasably against movement on the tool joint after said sleeve has been properly positioned. The peripheral face of flange 22e is preferably flush with the peripheral face of the body portion of the tool joint element.

It will be seen that the threaded connection between flanges 60e and 48e serves to connect sleeve 23e to joint element 14e drivingly, so the sleeve rotates with the stem, and also serves to position the inner sleeve and bearing longitudinally on the stem.

The remaining bearing elements and associated parts are generally similar to those shown in Fig. 13, the several similar parts having similar functions and being numbered similarly except as to the exponents which are here changed to e.

While I have shown a number of variational embodiments of my invention, it will be seen that they all have certain common characteristics and they are to be considered merely as illustrating a few of the variations which come within the scope of my broader claims, it being readily understandable that other variations may be substituted which will still lie within the spirit of the invention. Therefore, the foregoing description and illustrations are to be considered merely as illustrative of and not limitative on my broader claims.

I claim:

1. In combination with a rotary drill stem, a member rigidly connected to said stem, and a bearing about the pipe portion of the stem, said bearing including an inner and an outer sleeve capable of relative rotation, said inner sleeve being drivingly connected to the member so as to rotate with the stem, the connection between the inner sleeve and member being loose and thereby allowing relative gyratory movement between them.

2. In combination with a rotary drill stem comprising sections of drill pipe and tool joints coupling the sections, and a bearing about one of the pipe sections, said bearing including an inner and an outer sleeve capable of relative rotation, said inner sleeve being drivingly connected to one of the tool joints associated with said section so as to rotate with the stem, the connection between the inner sleeve and joint being loose and thereby allowing relative gyratory movement between them.

3. In combination with a rotary drill stem, a member rigidly connected to said stem, a bearing about the pipe portion of the stem, said bearing including an inner and an outer sleeve capable of relative rotation, and a driving connection between the inner sleeve and member, said connection including a resilient projection on the inner sleeve extending longitudinally into the member and sprung radially into a registering recess provided in the member at a point intermediate its ends.

4. In combination with a rotary drill stem, a member rigidly connected to said stem, a bearing about the pipe portion of the stem, said bearing including an inner and an outer sleeve capable of relative rotation, and a driving connection between the inner sleeve and member, said connection including a resilient, headed projection on the inner sleeve extending longitudinally into the member, said projection being sprung radially into a registering undercut recess provided in said member.

5. In combination with a rotary drill stem, a member rigidly connected to said stem, a bearing about the pipe portion of the stem, said bearing including an inner and an outer sleeve capable of relative rotation, and a driving connection between the inner sleeve and member, said connection including an annular flange about an end of the member and spaced annularly from said pipe portion, said flange having an undercut recess in it, and a projection on an end of said inner sleeve and projecting longitudinally between said pipe portion and flange, said projection having a head portion sprung into said undercut recess.

6. In combination with a rotary drill stem, a bearing about the stem and including an inner and an outer sleeve capable of relative rotation, and a rotative driving connection between the stem and inner sleeve, said connection being a loose one whereby there is allowed gyration of the inner sleeve with respect to the stem.

In witness that I claim the foregoing I have hereunto subscribed my name this 26 day of July, 1926.

JOHN GRANT.